FORWARD WAVE TUBE WHEREIN THE INTERACTION PATH COMPRISES
A SINGLE WIRE HELIX AND AN ADJACENT CONTRAWOUND HELIX

Filed Oct. 4, 1963

INVENTOR
MASON W. HUSE, JR
BY Leo R. Reynolds
AGENT

United States Patent Office
3,349,278
Patented Oct. 24, 1967

3,349,278

FORWARD WAVE TUBE WHEREIN THE INTERACTION PATH COMPRISES A SINGLE WIRE HELIX AND AN ADJACENT CONTRAWOUND HELIX

Mason W. Huse, Jr., Sudbury, Mass., assignor to Raytheon Company, Lexington, Mass., a corporation of Delaware Filed Oct. 4, 1963, Ser. No. 313,907
1 Claim. (Cl. 315—3.6)

ABSTRACT OF THE DISCLOSURE

The invention discloses a traveling wave amplifier device having high power handling capabilities and incorporating hybrid wave propagating structures. Nondispersive forward wave circuit means are disposed adjacent to the electron beam generation means. A dispersive forward wave circuit may then be positioned downstream along the interaction path adjacent to the collector electrode of the device. The resultant over-all amplifier utilizes the preferred characteristics of the dispersive and nondispersive components to also provide a device having uniform gain over a relatively broad band of frequencies.

Figure 1:
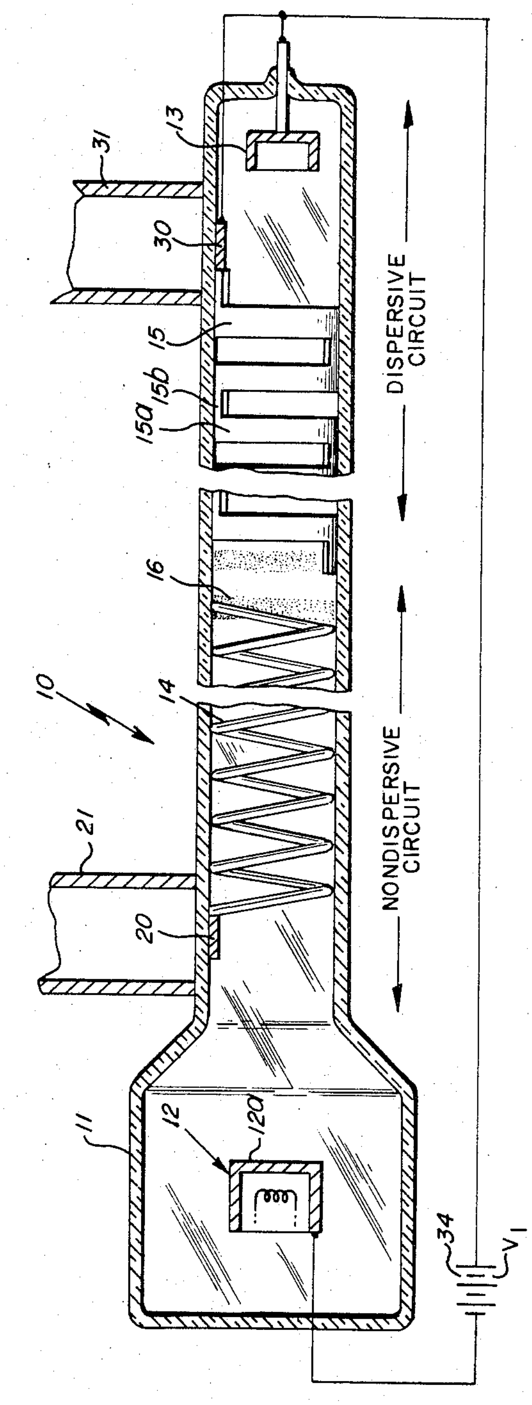

This invention relates to traveling wave tubes and more particularly to traveling wave amplifiers wherein a forward traveling electromagnetic wave interacts with an electron beam to produce amplification of the electromagnetic wave.

In the forward traveling wave amplifiers of the past an electron beam is projected through a forward wave circuit, such as a helix, towards a collector. The electron beam is adjusted to have a velocity slightly greater than the phase velocity of electromagnetic waves traveling in the same direction. Cumulative interaction between the beam and the wave occurs in the forward circuit and the wave is thereby amplified and ultimately extracted at the downstream end of said forward wave circuit, i.e., the end farthest away from the origin of said electron beam.

The structural characteristics of the forward wave circuit contribute importantly to the power handling capabilities and bandwidth properties of the traveling wave amplifier. For example, a single wire helix, by virtue of its low dispersion properties, is well suited for broad bandwidth applications. However, the single wire helix is an inherently poor structure for powers in excess of for example the range of 10 kilowatts peak power. At power levels above 10 kilowatts a strong backward wave is developed which interferes with the forward wave. This strong backward wave cannot effectively be suppressed at the aforesaid power levels. Furthermore, structurally the helix is a poor heat dissipator. Thus, at relatively high continuous wave power levels it heats up to such a temperature that it bends or is deformed and will ultimately be damaged or destroyed. On the other hand, there exists a contrawound helix or its ring-bar equivalent which is described in some detail in Patent No. 3,069,588 issued Dec. 18, 1962. The contrawound helix or its ring-bar equivalent is well suited for high power applications since the troublesome backward wave mode of the single helix is not present in the contrawound or ring-bar helix. At the same time, however, the contrawound helix or its ring-bar equivalent is not particularly suited for broadband applications because it is a relatively dispersive structure and hence narrow banded.

Accordingly, it is an object of the invention to provide an improved forward traveling wave amplifier with high power handling capabilities and relatively uniform gain versus frequency characteristics over the band to be amplified.

To this end there is provided, in accordance with the invention, an electron source for producing an electron beam; a collector electrode towards which said beam is directed; a substantially nondispersive forward wave circuit adjacent said electron source and terminated in a matched impedance at a distance along said forward wave circuit slightly less than the length of interaction between the electron beam and forward traveling waves required before the amplification of said waves becomes nonlinear; and a dispersive forward wave circuit adjacent said nondispersive forward wave circuit for providing a further interaction path between said electron beam and said traveling wave; and means for coupling the wave energy from said dispersive forward wave circuit to a utilization means.

It is to be understood that the term "dispersive" as used herein relates to the ratio of the phase velocity of the traveling wave and the group velocity of the traveling wave and that a substantially nondispersive structure would be one in which this ratio is substantially equal to unity throughout the frequency range utilized.

Figure 2:
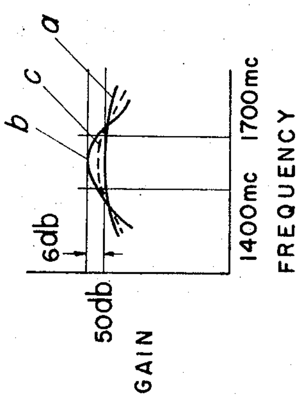

The novel features of the invention together with further objects and advantages thereof will be more fully comprehended from the following description considered in connection with the accompanying drawings, wherein:

FIG. 1 is a cross-sectional view of a traveling wave tube incorporating the hybrid forward wave propagating structure of the invention; and FIG. 2 is a graph illustrative of the gain versus frequency response of one embodiment of the invention.

Referring now to FIG. 1, there is shown a forward traveling wave tube 10 in which various tube elements are enclosed in an evacuated glass envelope 11. At opposite ends of the envelope are positioned an electron source, cathode 12$a$ of an electron gun 12 and a collector electrode 13 positioned in target relation with the electron source. The electron flow or beam is focussed by suitable means, not shown, to be coaxial with the longitudinal axis of the tube envelope. Positioned along the downstream portion of the path of flow is a dispersive forward wave circuit comprising a ring-bar helix 15. The ring-bar helix includes a plurality of rings 15$a$, adjacent ones of which are interconnected by bars 15$b$ alternately disposed at diametrically opposite points along the rings. It is noted that the ring-bar helix is one of many structures electrically equivalent to a contrawound helix and the use herein of a ring-bar is merely illustrative thereof. However, it is important that the desirable impedance properties, to wit, that the impedance of the fundamental component of the contrawound helix be substantially twice that of the single helix, be retained in any electrical equivalent chosen.

Positioned upstream along the path of flow is a relatively nondispersive forward wave structure comprising the single wire helix 14. Both helices are positioned coaxial with the tube envelope and with the path of flow. Input energy is supplied from waveguide 21 to a coupling strip 20 which strip is positioned to couple the electric vector in the rectangular waveguide 21 to the helix 14. Output energy is extracted in a similar manner from ring-bar 15 which is coupled to coupling strip 30 and thence to rectangular waveguide 31. Alternatively, input energy may be supplied to helix 14 by coaxial means having an inner conductor suitably coupled to helix 14 and output energy removed from ring-bar 15 by coaxial means having inner conductors coupled to the forward wave structure as is well known in the art.

In operation as a forward wave amplifier the velocity of the electron beam past the forward wave circuits is adjusted to be in synchronism with the phase velocity of a spacial harmonic component of the electromagnetic wave or input signal to be amplified. The velocity of the electron beam past the forward wave circuit is controlled by the accelerating voltage $V_1$ provided by voltage source 34 which exists between the electron source and the forward wave circuit. The forward traveling wave through helix 14 bunches the forward flowing electron beam giving rise thereon to a forward traveling space charge wave. This space charge wave which subsequently travels past ring-bar circuit 15 introduces a forward traveling electromagnetic wave thereon which travels therealong. Through cumulative interaction between the beam and the wave in both helices the wave is amplified and extracted for utilization at the downstream end of tube 10 by means of output coupling device 30 and waveguide 31.

In accordance with the invention the length of the nondispersive single helix forward wave circuit is a distance determined by the length of interaction and therefore amplification between the electron beam and the forward traveling wave which produces a linear amplification. As the gain is increased above a certain level the performance of the helical delay line becomes nonlinear. Accordingly, just prior to reaching this level, the helical delay line is terminated in a matched impedance which, for example, may comprise a dissipative material such as aquadag coated along the inner surface of the envelope 11 along portions adjacent the end turns of the helix 14. The thickness of the end coating 16 is tapered to provide a broadband dissipative termination. The forward traveling space charge wave impressed on the electron beam is then coupled to dispersive forward wave circuit 15 which further amplifies the electromagnetic wave. However, since the dispersive circuit 15 does not have a troublesome backward wave mode at the power levels contemplated in the device, oscillation is not produced and an efficient amplifier with very low harmonic content is thereby realized.

The above result may be better appreciated from an analysis of the graph of FIG. 2 and curves *a*, *b* and *c* therein. Curve *a* represents a plot of gain versus frequency in a traveling wave amplifier utilizing a single wire helix throughout and as such is indicative of prior art results. Curve *b* is a graph of gain versus frequency wherein a ring-bar forward wave circuit is utilized throughout the length of the tube and is likewise indicative of prior art results. Curve *c* represents a plot of gain versus frequency for the hybrid tube of the invention embodied in FIG. 1 wherein a nondispersive helical wire forward wave circuit is utilized up to a predetermined point of amplification and then the space charge electron beam is induced into a ring-bar dispersive forward wave circuit. As can be seen from a comparison of the curves of FIG. 2, the resultant curve *c* yields a compromise between gain and constant amplitude frequency response.

A further advantage results from the use of a contrawound or ring-bar type helix in the manner described, in that, with the contrawound or ring-bar helix more efficient interaction between the beam and the forward wave circuit is obtained with a given diametered structure than is obtainable with the same diameter structure in a single wire electrical forward wave circuit. Accordingly, greater clearance between the contrawound structure and the beam can be provided at the downstream end of the beam than would be the case in the single wire helical structures of the past. Greater clearance between the structure and the beam results in higher power handling capabilities.

It should be understood that the foregoing description of an embodiment of the invention is exemplary and that many variations thereof will occur to those skilled in the art without departing from the spirit and scope of this invention. Accordingly, it is desired that this invention not be limited by the particular details described herein except as defined by the appended claims.

What is claimed is:

In combination:

means for producing an electron beam;

a collector electrode toward which said beam is directed;

a substantially nondispersive forward wave circuit including a single wire helix adjacent said means for producing an electron beam and terminated in a matched impedance at a distance from said means for producing an electron beam slightly less than the length of interaction between the electron beam and forward traveling waves in said forward wave circuit required before the amplification of the forward wave becomes nonlinear;

a dispersive forward wave circuit including a contrawound helix adjacent said nondispersive forward wave circuit for providing a further interaction path between said electron beam and said traveling waves;

and means for coupling output wave energy from said dispersive forward wave circuit.

References Cited

UNITED STATES PATENTS

| | | | |
|---|---|---|---|
| 2,584,597 | 2/1952 | Landauer | 315—3.6 |
| 2,964,671 | 12/1960 | Chang | 315—3.6 |

HERMAN KARL SAALBACH, *Primary Examiner.*

M. NUSSBAUM, *Assistant Examiner.*